(12) United States Patent  (10) Patent No.: US 7,611,180 B1
Fisher et al.  (45) Date of Patent: Nov. 3, 2009

(54) ROBOTIC END OF ARM TOOL METHOD AND APPARATUS

(75) Inventors: Trent P. Fisher, Yellow Springs, OH (US); John M Westbeld, Dayton, OH (US); Robert M. Miller, Dayton, OH (US); Jason R. Heinz, Beavercreek, OH (US)

(73) Assignee: SAS Automation, Ltd., Xenia, OH (US)

( * ) Notice: Subject to any disclaimer, the term of this patent is extended or adjusted under 35 U.S.C. 154(b) by 430 days.

(21) Appl. No.: 11/493,953

(22) Filed: Jul. 27, 2006

(51) Int. Cl.
*B25J 9/00* (2006.01)
*B25J 15/06* (2006.01)

(52) U.S. Cl. ............... 294/65; 294/81.2; 901/40
(58) Field of Classification Search ............ 294/65, 294/87.1, 81.2, 81.6; 901/30, 40
See application file for complete search history.

(56) References Cited

U.S. PATENT DOCUMENTS

| | | | | |
|---|---|---|---|---|
| 4,653,793 A | * | 3/1987 | Guinot et al. | 294/86.4 |
| 4,685,714 A | * | 8/1987 | Hoke | 294/81.2 |
| 4,767,143 A | * | 8/1988 | Michael et al. | 294/65 |
| 5,152,566 A | * | 10/1992 | Blatt et al. | 294/81.2 |
| 5,161,847 A | * | 11/1992 | Yakou | 294/119.1 |
| 5,387,068 A | * | 2/1995 | Pearson | 414/404 |
| 5,993,365 A | | 11/1999 | Stagnitto et al. | |
| 6,273,483 B1 | * | 8/2001 | Bone | 294/86.4 |
| 6,416,706 B1 | | 7/2002 | Fisher et al. | |
| 6,502,877 B2 | * | 1/2003 | Schick et al. | 294/65 |
| 6,722,842 B1 | * | 4/2004 | Sawdon et al. | 414/729 |
| 6,796,588 B2 | * | 9/2004 | Hsieh | 294/65 |
| 7,029,046 B2 | * | 4/2006 | Lim | 294/65 |

* cited by examiner

*Primary Examiner*—Dean J Kramer
(74) *Attorney, Agent, or Firm*—MacMillan, Sobanski & Todd, LLC

(57) ABSTRACT

An end of arm tool has a mounting bracket mounting the end of arm tool to the robot arm for movement therewith and has a plurality of operating mechanisms mounted to the mounting bracket, a plurality of gripping devices each operatively connected to a respective operating mechanism and movable along a path, and a plurality of individual motors each operatively connected to a respective gripping device for moving the respective gripping device along its respective path. At least one programmable controller for operating the motors is provided to adjust the positions of the gripping devices along their respective paths to one of a plurality of predetermined positions established by the controller for gripping the article and to position the end of arm tool adjacent the article so that at least one of the gripping devices grips the article.

15 Claims, 7 Drawing Sheets

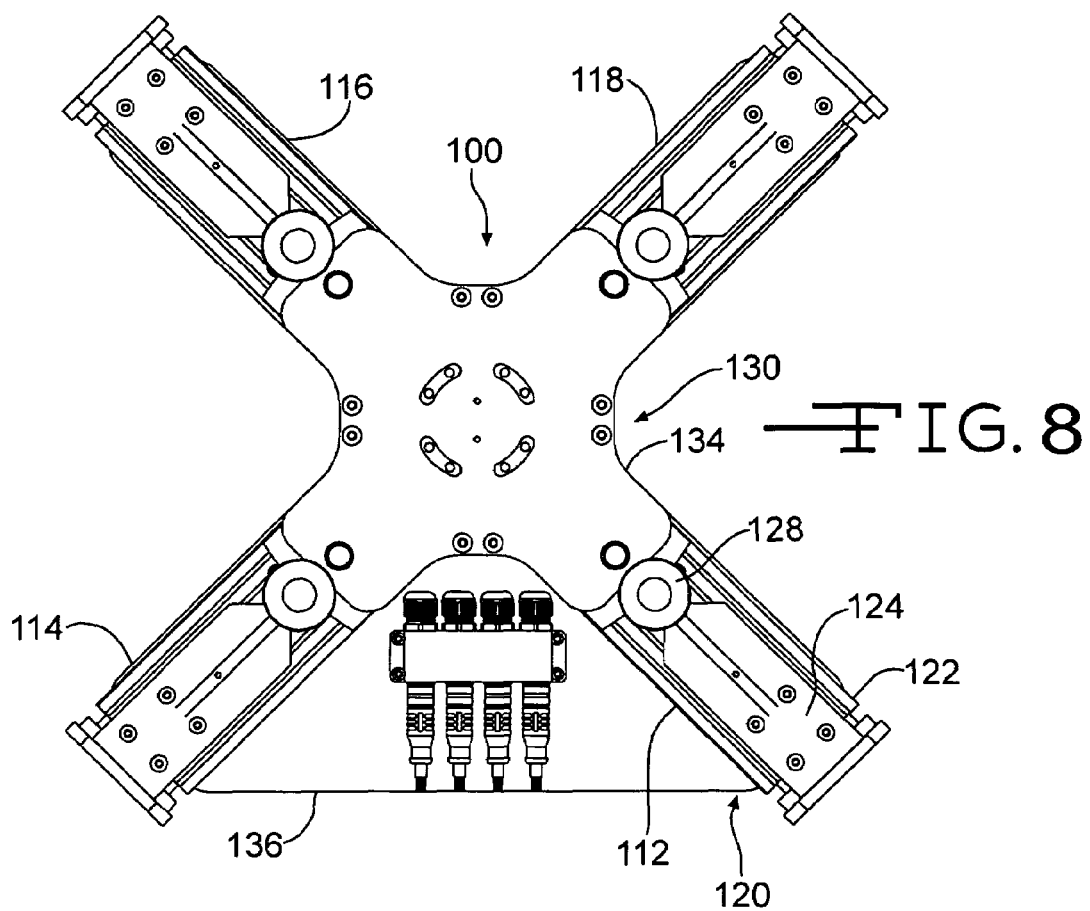
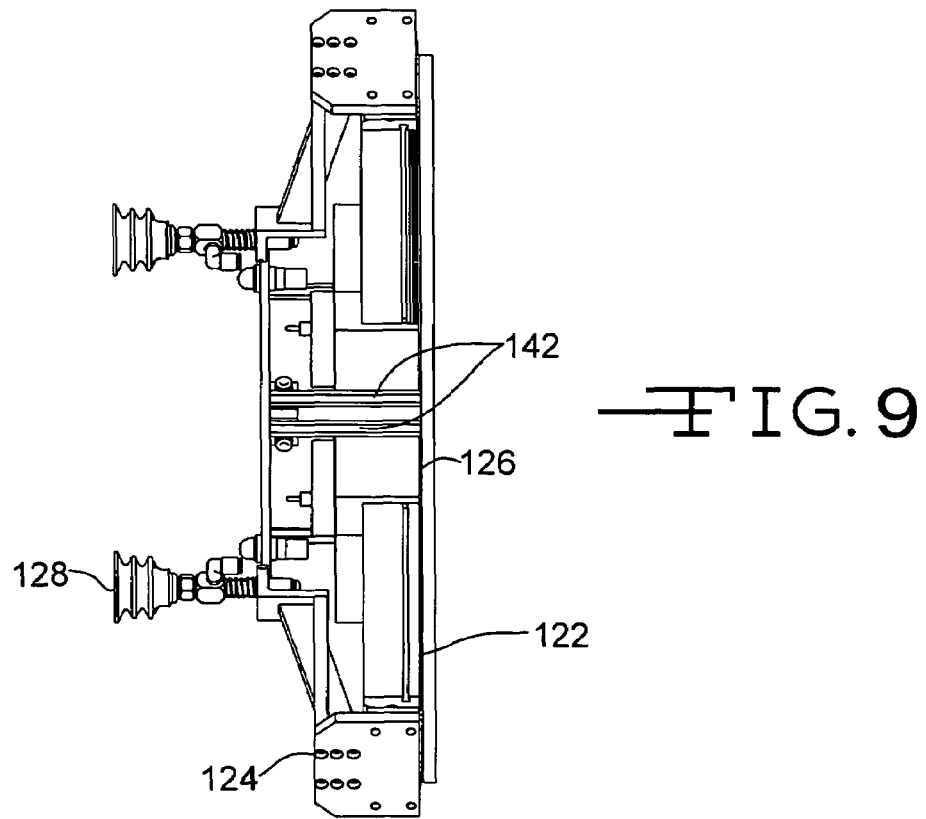

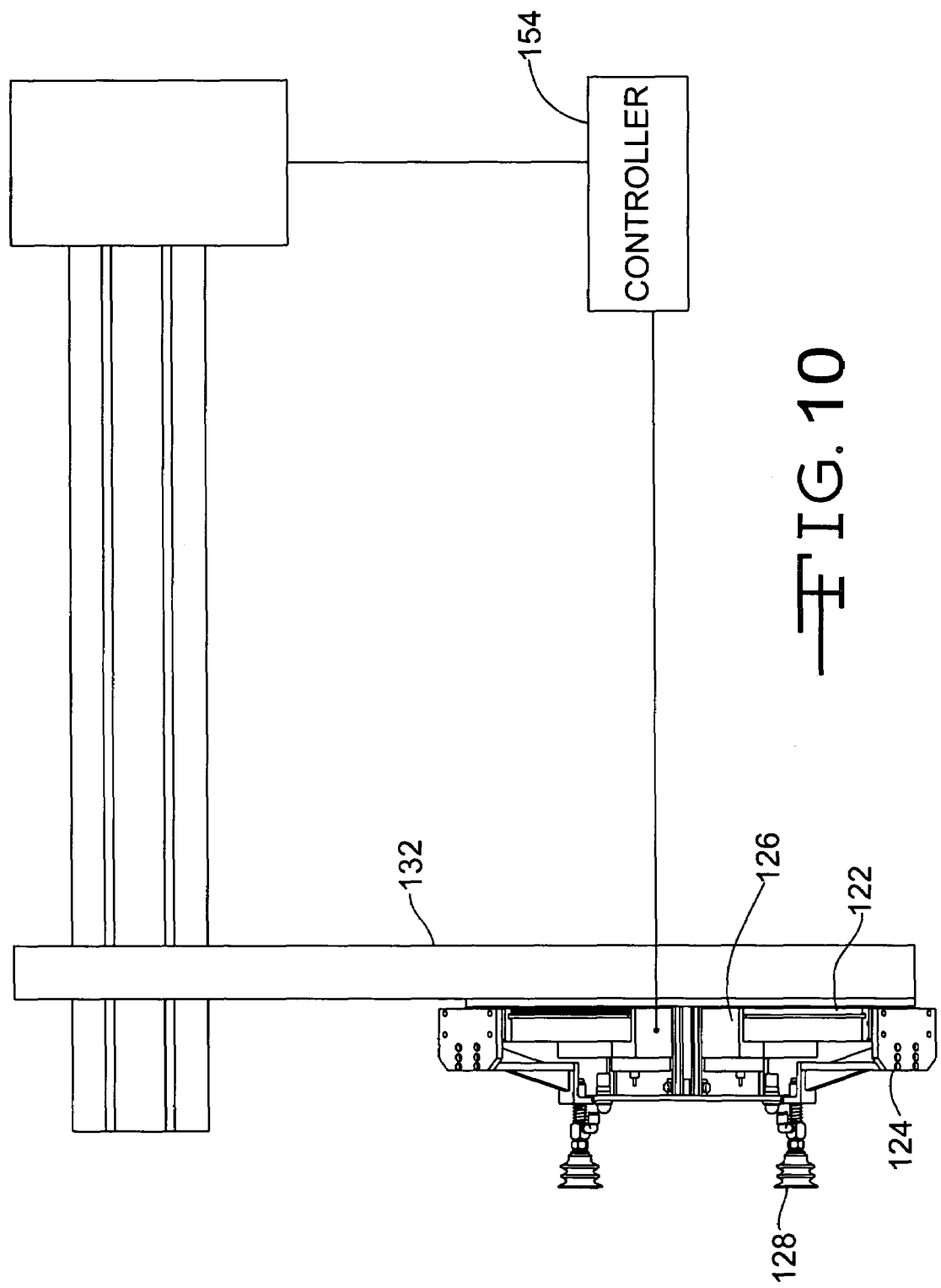

ROBOTIC END OF ARM TOOL METHOD AND APPARATUS

BACKGROUND OF THE INVENTION

This invention relates in general to robotic arms and end of arm tools for use in picking up and moving articles to or from a specific location.

Robotic arms with end of arm tooling are used in many applications in many industries. Often these devices are controlled by a programmable controller to do a repetitive task with the end of arm tooling being manually set in a fixed position to repetitively pick up and release articles. If the robotic arm and end of arm tooling are to be used in a different situation, such as moving a different shape of article than the previous one, the end of arm tool usually has to be manually reconfigured for that purpose. If this reconfiguration has to occur often, the cost of labor and the down time for utilization of the equipment can be significant.

SUMMARY OF THE INVENTION

This invention relates to end of arm tooling for a robotic arm which together are programmable to change their configurations and operations to any one of a multiple of preprogrammed configurations and operations.

In one aspect of the present invention a method of controlling an end of arm tool mounted on a robotic arm for placing or retrieving an article is provided, comprising providing an end of arm tool having a plurality of operating mechanisms, each operating mechanism supporting a separate gripping device each movable by its respective operating mechanism along a separate elongated path spaced from the paths of the other gripping devices; providing a plurality of motors at least one motor operatively connected to a respective gripping device for moving that gripping device along its respective path; using at least one programmable controller programmed to operate the motors so as to adjust the positions of the gripping devices along their respective paths to one of a plurality of predetermined positions established by the controller for gripping the article and to position the end of arm tool adjacent the article so that at least one of the gripping devices grips the article; and moving the arm so as to move the article. In another aspect of the invention, the method may include making the separate paths of the gripping mechanisms extend longitudinally in a common plane. In a further aspect, the method may include providing each operating mechanism with a bracket movable by the at least one motor and mounting the respective gripping device to the bracket for movement with the bracket, and further may include providing each motor with a stepping mechanism controlled by the at least one controller for positioning the respective gripping device at one of the predetermined locations.

The invention may also include one form of an apparatus comprising an end of arm tool having a mounting bracket for mounting the end of arm tool on the robotic arm; a plurality of operating mechanisms mounted on the mounting bracket; and a plurality of gripping devices one each supported by a respective operating mechanism, each gripping device being independently movable by its respective operating mechanism along a separate elongated path spaced from the paths of the other gripping devices. Such an apparatus may also include each operating mechanism having at least one motor operatively connected to the respective gripping device for moving the respective gripping device along its respective path. Such an apparatus may further include each operating mechanism having a bracket movable by the at least one motor and the respective gripping device being secured to the bracket for movement with the bracket. Such an apparatus may yet further include at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article. Such an apparatus may also include each motor having a stepping mechanism controlled by at least one controller for positioning the respective gripping device at one of several predetermined locations. The apparatus may further include the elongated paths being linear and extending in a common plane. Yet further the apparatus may include the operating mechanisms being substantially identical and each independently pivotable in the common plane containing their elongated paths. The apparatus may also include a fastener associated with each operating mechanism for holding the operating mechanism in fixed position in the common plane after the operating mechanism has been pivoted.

The invention may include another form of an apparatus comprising an end of arm tool for attachment to a robotic arm, comprising a mounting bracket for mounting the end of arm tool on the robotic arm; a plurality of adjustable operating mechanisms mounted on the mounting bracket; a plurality of gripping devices one each associated with a respective operating mechanism and movable along a path to a desired location; and a plurality of motors at least one of which is operatively connected to a respective gripping device for moving that gripping device along that gripping device's respective path. Such an apparatus may also include each operating mechanism having a bracket movable by the respective motor and the respective gripping device being secured to the bracket for movement with the bracket. The apparatus may also include at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article. Such an apparatus may further include each motor having a stepping mechanism controlled by the at least one controller for positioning the respective gripping device at one of several predetermined locations. The apparatus may also include the operating mechanisms being substantially identical and pivotable in the common plane containing their paths. Such apparatus may further include a fastener associated with each operating mechanism for holding the operating mechanism in fixed position in the common plane after the operating mechanism has been pivoted.

Yet a further apparatus of the present invention may include an assembly of a robot arm and end of arm tool, comprising a robot arm movable relative to an article; an end of arm tool, having a mounting bracket mounting the end of arm tool to the robot arm for movement therewith and having a plurality of operating mechanisms mounted to the mounting bracket, a plurality of gripping devices each operatively connected to a respective operating mechanism and movable along a path, and a plurality of individual motors each operatively connected to a respective gripping device for moving the respective gripping device along its respective path; and at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article. Such an apparatus may also include each operating mechanism having a bracket movable by the respective motor and the respective gripping device being secured to the bracket for movement with the bracket. Such an apparatus may further include each motor having a stepping mechanism controlled by at least one controller for positioning the respective gripping device at one of the several predetermined locations. Such an apparatus may yet further include the paths of movement of the gripping devices being linear and extending in a common plane. This apparatus may also include the operating mechanisms being substantially identical and pivotable in the common plane containing their paths. The apparatus may also include a fastener associated with each operating mechanism for holding the operating mechanism in fixed position in the common plane after the operating mechanism has been pivoted.

Still other aspects of the present invention will become apparent to those skilled in this art from the following description wherein there is shown and described preferred embodiments of this invention, simply by way of illustration of some modes best suited to carry out the invention. As it will be realized, the invention is capable of other different embodiments and its several details are capable of modification in various aspects all without departing from the invention. Accordingly, the drawings and descriptions will be regarded as illustrative in nature and not as restrictive.

BRIEF DESCRIPTION OF THE DRAWINGS

FIG. 8 is a bottom view of the embodiment of FIG. 7;

FIG. 9 is a right side view of the embodiment of FIG. 7; and

FIG. 10 is a right side view of the embodiment of FIG. 7 including a robot arm and controller shown schematically.

DETAILED DESCRIPTION OF THE PREFERRED EMBODIMENT

Figure 1:
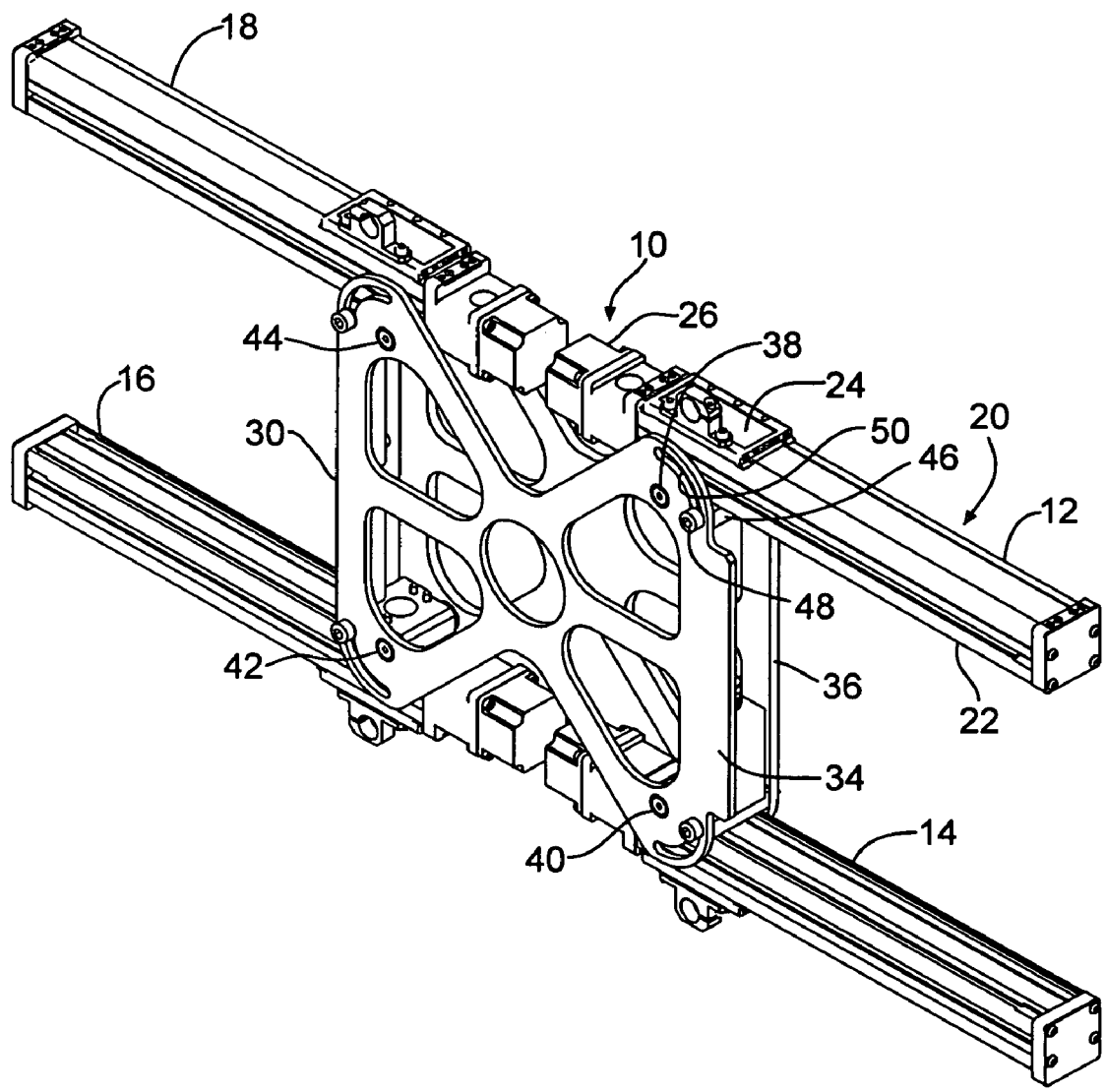
FIG. 1 is a front perspective view of a first embodiment of an end of arm tool of the present invention.
Figure 2:
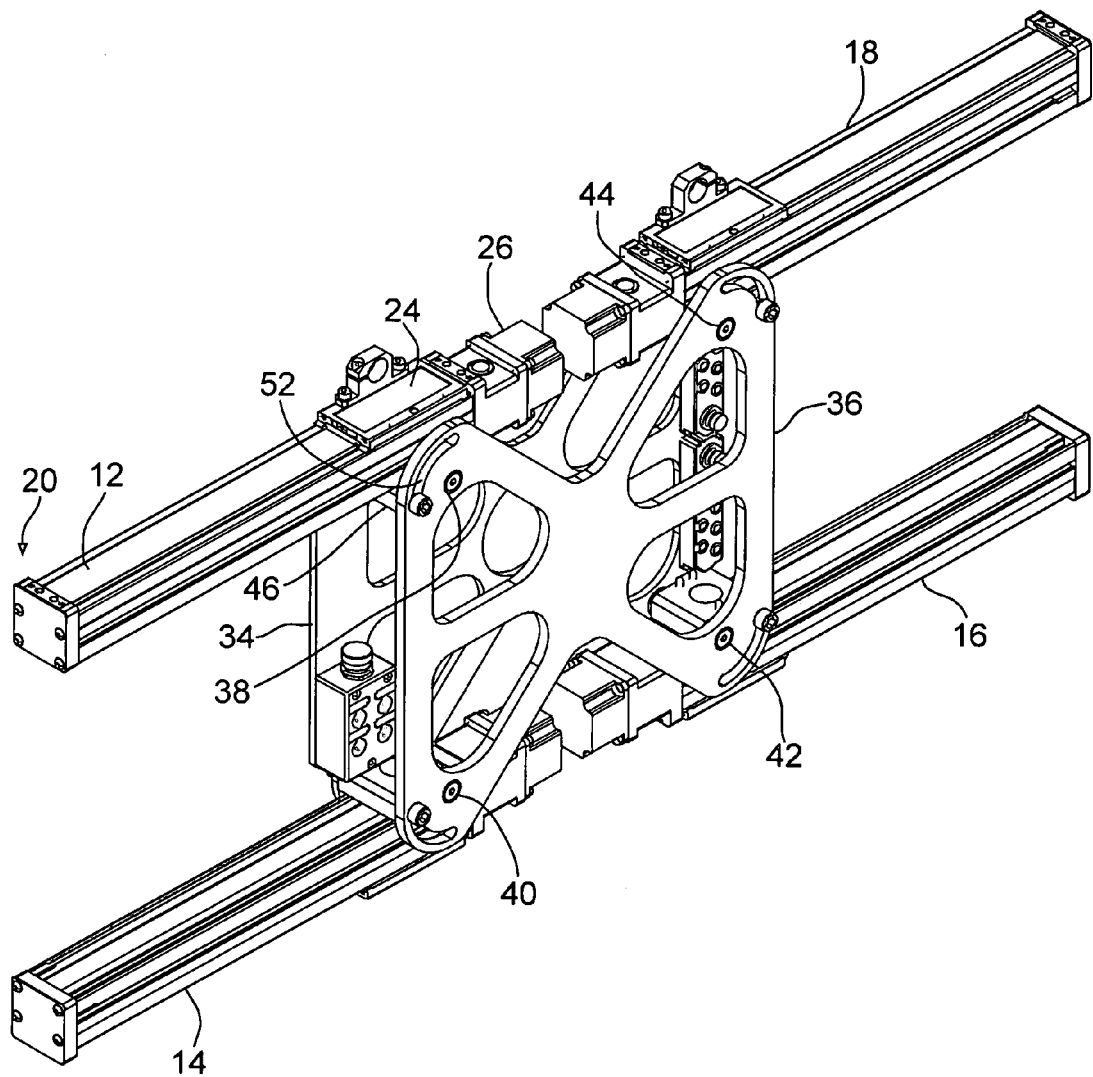
FIG. 2 is a back perspective view of the embodiment of FIG. 1.

Referring now to the drawings, there is illustrated in FIG. 1 a first embodiment of the apparatus of the present invention generally designated by the numeral 10 which is an end of arm tool for a robot mechanism. Tool 10 includes four basic operating mechanisms 12, 14, 16 and 18, which are identical in construction. It is to be understood that more or fewer operating mechanisms may be used depending on the desired use. Taking operating mechanism 12 as an example, it includes a motor 20 which can be, for example, a slide table type stepping motor such as that designated as a series LXP from SMC Corporation, and which is illustrated in the figures of the first embodiment of the invention. This motor 20 basically includes a housing 22 and a bracket 24 supported by a lead screw (not shown) driven by a stepping motor 26. Bracket 24 can be moved longitudinally back and forth along housing 22 by rotation of the lead screw. It is to be understood that any one of a large number of other types of motors or other devices may be used to move the gripping device to a desired location. Other examples include pneumatic, hydraulic and electric mechanical devices. Bracket 24 can be used to support a gripping device of any desired type, such as the vacuum gripping device 128 shown in FIG. 7 in connection with a second embodiment described later herein, and thus move the gripping device to a desired location along the longitudinal axis of housing 22. Although a linear, straight line motion is shown, it is to be understood that the motion can be perpendicular to the length of the housing. Also, the motion can be along curved lines, rotational, or complex to follow along different directional vectors. Such movement would enable the gripping device to be moved in any desired 3D space and be aimed in any desired orientation. The gripping device can be any device suitable for griping, holding or manipulating objects, and can operate using pneumatic, hydraulic, magnetic or electric mechanical principles.

Figure 3:
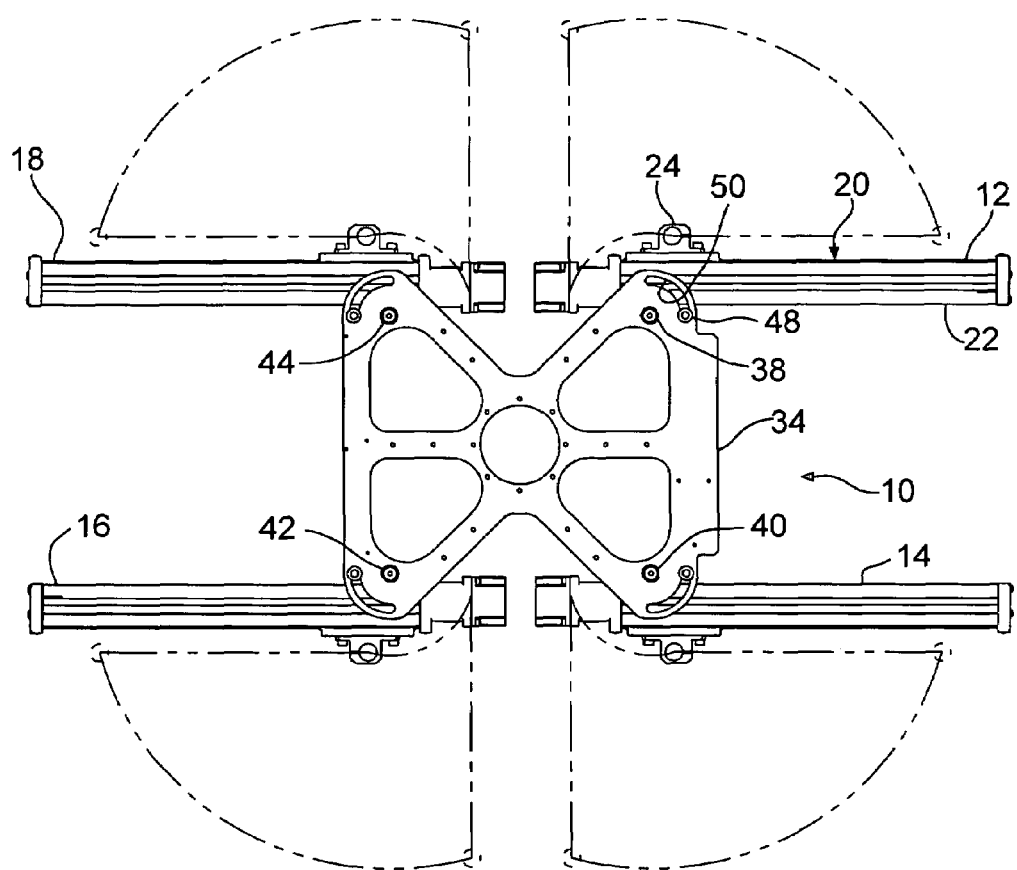
FIG. 3 is a front view of the first embodiment showing in phantom line the range of swinging movement of multiple operating mechanisms of the first embodiment.
Figure 4:
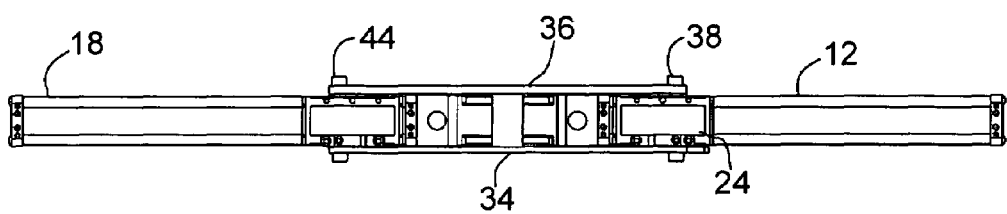
FIG. 4 is a top view of the first embodiment of an end of arm tool.
Figure 5:
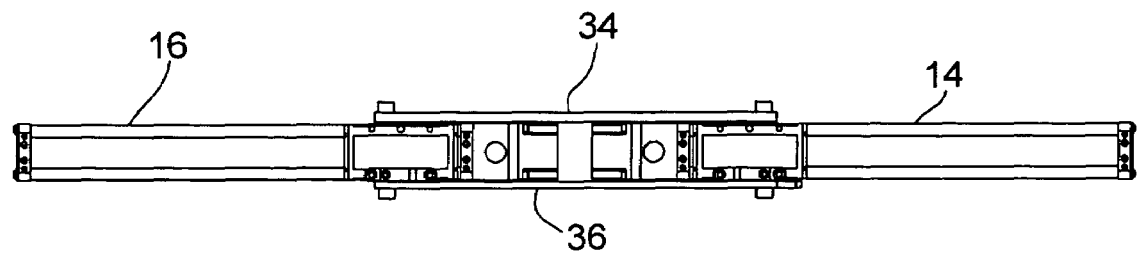
FIG. 5 is a bottom view of the first embodiment of an end of arm tool.
Figure 6:
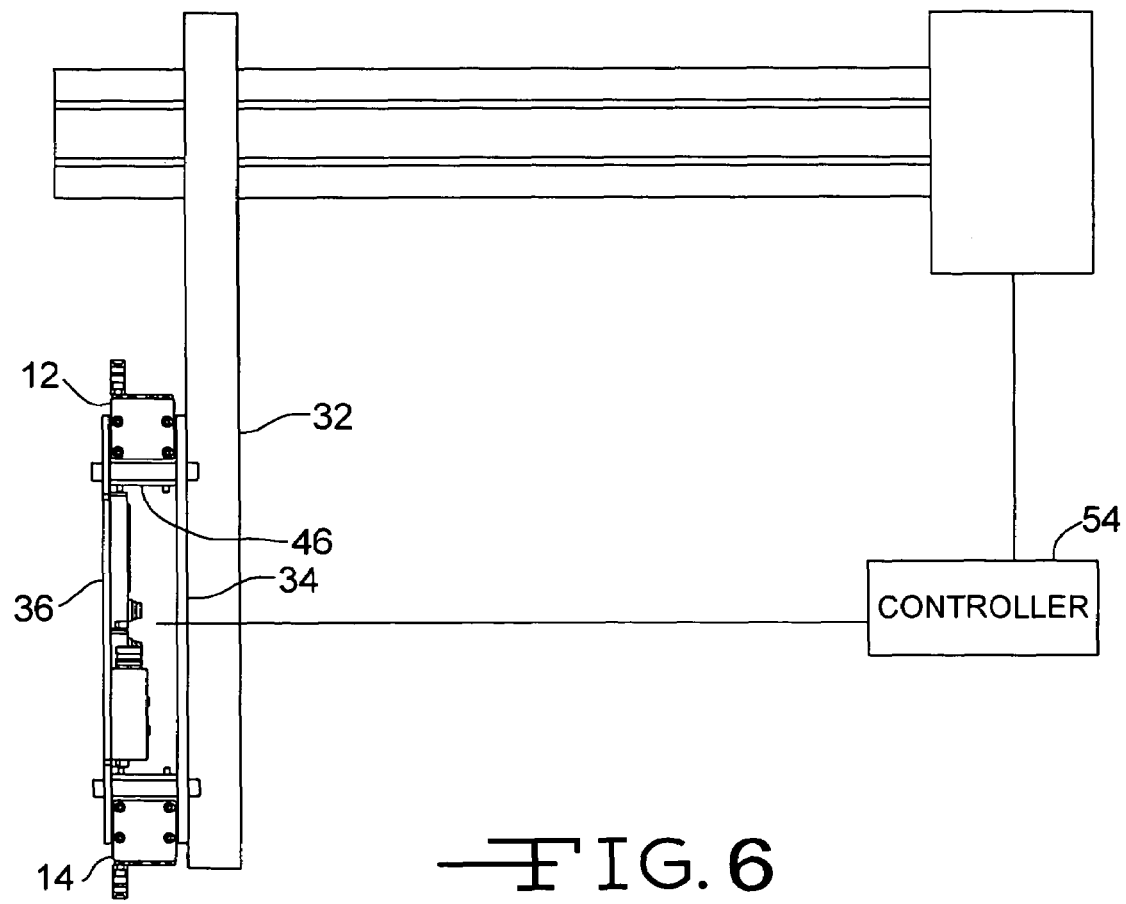
FIG. 6 is a right side view of the first embodiment with a robot arm and controller shown schematically.

Each of the operating mechanisms 12, 14, 16 and 18 is mounted to a mounting bracket 30 which is used to mount the end of arm tool 10 to a robotic arm 32 (see FIG. 6). Robotic arm 32 can be of any desired type and mounting bracket 30 can be of an appropriate configuration to mate with the desired robotic arm 32 and provide the desired stability. In the embodiment of FIG. 1 the mounting bracket 30 is constructed of two substantially identical plates 34 and 36 which are secured together in spaced parallel relation by four pins 38, 40, 42 and 44. In the embodiment of FIG. 1, the operating mechanism 12 is pivotably mounted to mounting bracket 30 by a mounting plate 46 having a hole through which pin 38 passes so that plate 46 is free to rotate about pin 38. Plate 46 is secured to housing 22 so that housing 22 is free to pivot laterally with plate 46 through approximately 90 degrees as shown by the phantom arcuate lines in FIG. 3. A locking screw 48 passes through arcuate slots 50 and 52 in plates 34 and 36, respectively, and through a hole in plate 46. Slots 50 and 52 are formed with their center of radius on pin 38. Locking screw 48 can be tightened to hold operating mechanism 12 in any desired position within the pivotal range of the operating mechanism 12. All of the operating mechanisms 12, 14, 16 and 18 can thus be independently pivoted, each through approximately 90 degrees, and then locked in position for use. Generally, the operating mechanisms are symmetrically positioned for use about the center of the end of arm tool 10 so that the center of gravity is in the center of the tool 10.

A programmable controller 54 (see FIG. 6) is operatively connected to the robotic arm 32 and the operating mechanisms 12, 14, 16 and 18. The programmable controller 54 can be either a single controller or multiple controllers, as desired. The controller 54 can be the same as the controller for the robotic arm 32, or can be a different controller. The controller 54 is generally programmed to provide a multiplicity of motions for both the robotic arm 32 and the operating mechanisms 12, 14, 16 and 18, depending on the operating conditions required. The controller and associated software for the operation of the operating mechanisms 12, 14, 16 and 18 can be added to existing robotic mechanisms, or in the alternative, the software can be added to existing controllers of robotic mechanisms. The controller is optionally provided with various input and output devices and other suitable features for connection and communication with other devices associated with the robotic mechanisms.

The programmable controller 54 can be programmed to move the robotic arm to any one of a number of operating stations where operations are to be performed and to perform different operations with the end of arm tool 10 at each of those stations. For example, if the robotic arm 32 and end of arm tool 10 are to be used in an article manufacturing environment where various different shaped articles are to be removed from respective molds, the programmable controller 54 can be programmed to move the robot arm 32 to each of the respective molds and to operate one or more of the operating mechanisms 12, 14, 16 and 18 so as to position one or more of their respective gripping devices, such as vacuum gripping device 128, along the longitudinal axis of its respective housing and move it into engagement with the article in a particular mold and activate the gripping device, such as by operating a vacuum source (not shown) operatively connected to the gripping device to thus remove the article from the mold.

It is contemplated that the robotic arm 32 and end of arm tool 10 of the present invention can be used where not all of the operating mechanisms 12, 14, 16 and 18 are used to pick up one article. For example, one operating mechanism such as 12 may be used to pick up one article while another operating mechanism 14 can be used to pick up a different article, even a different shaped article, from a different mold. It is also contemplated, for example, to use two or more operating mechanisms 12, 14, 16 and 18 of the end of arm tool 10 to pick up one article and one or more other operating mechanisms 12, 14, 16 and 18 to pick up a different shaped article from another mold and then deposit all of the articles thus picked up at other predetermined locations which are preprogrammed into the programmable controller 54. It is contemplated that various combinations of movements can be programmed into the programmable controller to fit the needs of a particular installation. The robotic arm 32 and end of arm tool 10 can likewise be used to pick up different articles from multiple locations and place these articles in respective molds.

It is further contemplated that the robotic arm 32 and end of arm tool 10 can be used in many environments other than mold making. For example, it is contemplated that the present invention can be used to remove different shaped articles or packages from conveyors or storage bins and move them to other locations by using one or more of the operating mechanisms 12, 14, 16 and 18, and thus can include moving multiple articles simultaneously or sequentially.

The programmable controller 54 can be programmed with several operating modes in advance of use of the robotic arm 32 and end of arm tool 30. The programmable controller 54 can be configured to receive an input from an operator or from a signaling device that indicates to the controller what mode of operation the end of arm tool is to operate in for the next movement and then move the robotic arm 32 and end of arm tool 30 accordingly. In any of the above described examples of use of the present invention or wherever the present invention is suitable for use, the programmable controller 54 can be programmed to perform such operations in the sequences desired.

Referring now to a second preferred embodiment as shown in FIGS. 7-10, there is illustrated an end of arm tool generally designated by the numeral 100. Tool 100 includes four basic operating mechanisms 112, 114, 116 and 118, which are identical in construction and similar to the operating mechanisms of the first preferred embodiment described above. As with the first embodiment, it is to be understood that more or fewer operating mechanisms may be used depending on the desired use. Taking operating mechanism 112 as an example, it includes a motor 120 which can, for example, be the same slide table type stepping motor 20, described with respect to the first embodiment. This motor 120 basically includes a housing 122 and a bracket 124 supported by a lead screw (not shown) driven by a stepping motor 126. It is to be understood that any one of a large number of other types of motors may be used as the motor 120. Bracket 124 is different than bracket 24 of the first embodiment, but is also used to support a gripping device of any desired type, such as the vacuum gripping device 128 shown in FIG. 7. Bracket 124 extends over the housing 122 toward the center of tool 100 so that the gripping devices 128 of operating mechanisms 112, 114, 116 and 118 will be closer together than if they were mounted at the end of housing 122.

Figure 7:
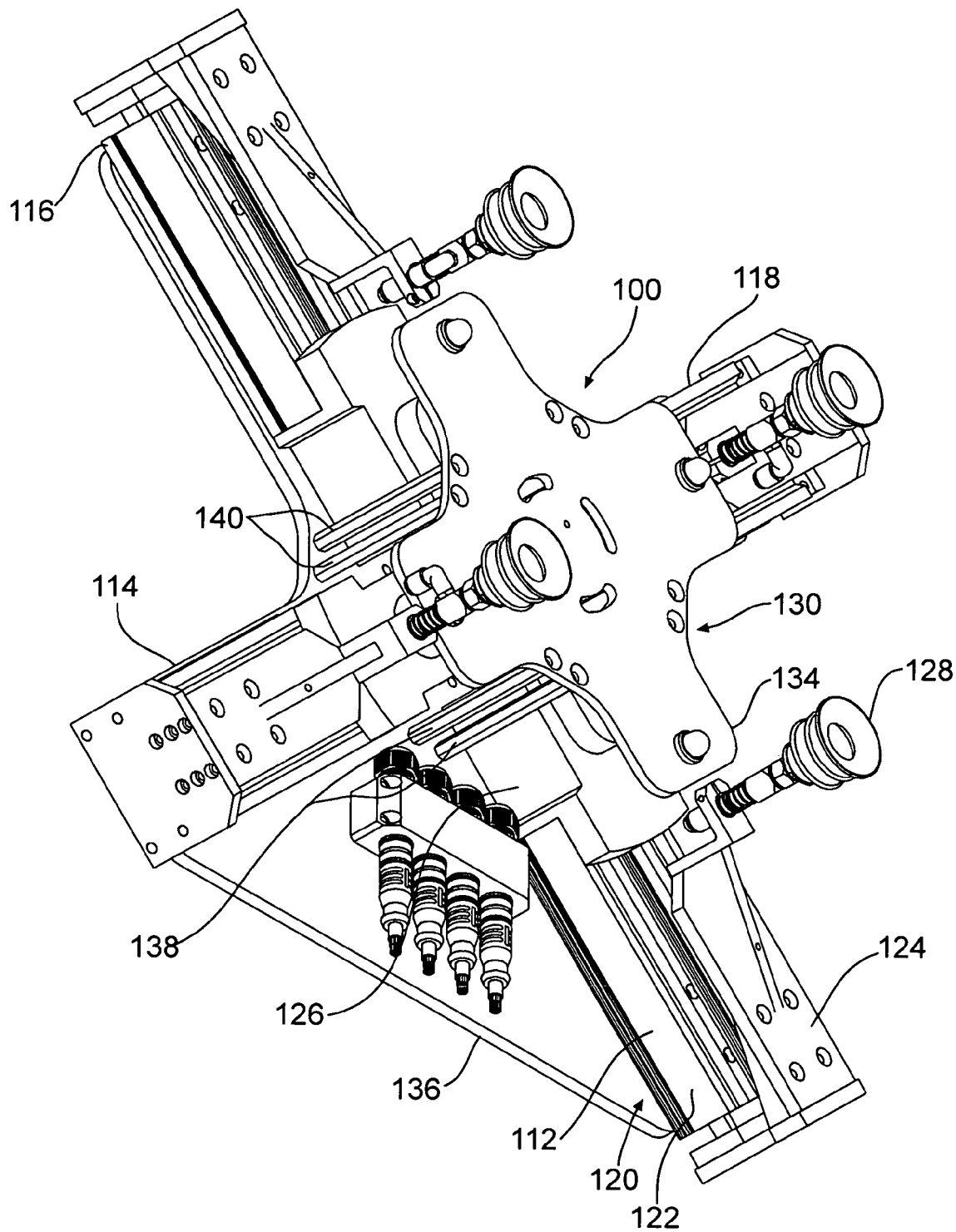
FIG. 7 is a perspective view of a second embodiment of an end of arm tool in accordance with the present invention.

Each of the operating mechanisms 112, 114, 116 and 118 is mounted to a mounting bracket 130 which is used to mount the end of arm tool 100 to a robotic arm 132. As with the first embodiment, robotic arm 132 can be of any desired type and mounting bracket 130 can be of an appropriate configuration to mate with the desired robotic arm 130. In the embodiment of FIGS. 7-9, the mounting bracket 130 is constructed of two plates 134 and 136 which are secured together in spaced parallel relation by four pairs of columns, three of which, pairs of columns 138, 140, 142 are shown while a fourth pair of columns symmetrically positioned around the mounting bracket from the other pairs of columns are not shown. In the embodiment of FIGS. 7-10, operating mechanisms 112, 114, 116 and 118 are mounted in fixed positions to mounting bracket 130. The operating mechanisms of this embodiment are separated by 90 degrees and are thus symmetrically positioned about the center of the end of arm tool 100 so that the center of gravity is in the center of the tool 100.

A programmable controller 154 (see FIG. 10) is operatively connected to the robotic arm 132 and the operating mechanisms 112, 114, 116 and 118. Programmable controller 154 can be identical to programmable controller 54 and all of the various functions described above with regard to programmable controller 54 can be carried out by controller 154 as well and will therefore not be described in detail again. Likewise, the various environments described above with respect to the first embodiment in which that embodiment can be utilized apply equally to this second embodiment.

It is also contemplated by the present invention that unlike the above two described embodiments the operating mechanisms may operate along paths different from linear paths as shown. For example, it is contemplated that the operating mechanisms may allow the gripping devices to move along curvilinear paths and in more than one plane. Furthermore, although the operating environment has been described in connection with mold making operations and article or package movement, the invention should not be considered as usable only in those environments.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A method of controlling an end of arm tool mounted on a robotic arm for placing or retrieving an article, comprising the steps of:

provide an end of arm tool having a plurality of operating mechanisms, each of the operating mechanisms being independently pivotable in a common plane and including a fastener for holding the operating mechanism in a fixed position after the operating mechanism has been pivoted;

a single separate gripping device carried by a corresponding bracket moveably mounted upon each of said operating mechanisms with each gripping device movable by its respective operating mechanism along a separate elongated path spaced from the paths of the other gripping devices;

providing a plurality of motors at least one motor operatively connected to a respective gripping device for moving that gripping device along its respective path;

pivoting at least one of the operating mechanisms into a position;

fixing the at least one of the operating mechanisms in position with the fastener associated with the operating mechanism; and using at least one programmable controller programmed with a plurality of operating modes for the robotic arm and end of arm tool, each of the modes being selectable by the controller based on an input that indicates to the controller what mode of operation the end of arm tool is to operate in for the next movement and then move the robotic arm and end of arm tool accordingly.

2. A method of controlling an end of arm tool mounted on a robotic arm for placing or retrieving an article, comprising the steps of:

providing an end of arm tool having a plurality of operating mechanisms, each operating mechanisms being independently pivotable in a common plane and including a fastener for holding the operating mechanism in a fixed position after the operating mechanism has been pivoted, each operating mechanism supporting a single separate gripping device carried by a corresponding bracket moveably mounted upon each of the operating mechanisms with each gripping device movable by its respective operating mechanism along a separate elongated path spaced from the paths of the other gripping devices;

providing a plurality of motors at least one motor operatively connected to a respective gripping device for moving that gripping device along its respective path;

pivoting at least one of the operating mechanisms into a position;

fixing the at least one of the operating mechanisms in position with the fastener associated with the operating mechanism;

using at least one programmable controller programmed to operate the motors so as to adjust the positions of the gripping devices along their respective paths to one of a plurality of predetermined positions established by the controller for gripping the article and to position the end of arm tool adjacent the article so that at least one of the gripping devices grips the article; and moving the arm so as to move the article.

3. The method of claim 2 including making the separate paths of the gripping devices extend longitudinally in the common plane.

4. The method of claim 2 including providing each operating mechanism with a bracket movable by the at least one motor and mounting the respective gripping device to the bracket for movement with the bracket.

5. The method of claim 4 including providing each motor with a stepping mechanism controlled by the at least one controller for positioning the respective gripping device at one of the predetermined locations.

6. An end of arm tool for attachment to a robotic arm, comprising:

a mounting bracket for mounting the end of arm tool on the robotic arm;

a plurality of operating mechanisms mounted on the mounting bracket, the operating mechanisms being substantially identical and each being independently pivotable in a common plane containing their elongated paths;

a fastener associated with each operating mechanism for holding the operating mechanism in a fixed position in the common plane after the operating mechanism has been pivoted;

a plurality of gripping devices, with one each gripping device carried by a corresponding gripper bracket moveably mounted upon a corresponding one of the operating mechanisms, each gripping device being independently movable along a separate elongated path spaced from the paths of the other gripping devices by at least one motor carried by its respective operating mechanism; and at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article.

7. The end of arm tool of claim 6 wherein the elongated paths are linear and extend in the common plane.

8. The end of arm tool of claim 6 wherein each operating mechanism has a gripper bracket movable by the at least one motor with the respective gripping device being secured to the bracket for movement with the bracket.

9. The end of arm tool of claim 8 including each motor having a stepping mechanism controlled by at least one controller for positioning the respective gripping device at one of several predetermined locations.

10. An end of arm tool for attachment to a robotic arm, comprising:

a mounting bracket for mounting the end of arm tool on the robotic arm;

a plurality of adjustable operating mechanisms mounted on the mounting bracket, the operating mechanisms being substantially identical and being pivotable in a common plane containing their motion;

a fastener associated with each operating mechanism for holding the operating mechanism in a fixed position in the common plane after the operating mechanism has been pivoted;

a plurality of gripping devices with each gripping device carried by a corresponding gripper bracket moveably mounted upon a corresponding one of the operating mechanisms and movable along a path to a desired location the paths being linear and extending in a common plane; and a plurality of motors at least one of which is operatively connected to a respective gripper bracket device for moving that gripper bracket and the associated gripping device along that gripping device's path.

11. The end of arm tool of claim 10 including at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article.

12. The end of arm tool of claim 11 including each motor having a stepping mechanism controlled by the at least one controller for positioning the respective gripping device at one of several predetermined locations.

13. An assembly of a robot arm and end of arm tool, comprising:
   a robot arm movable relative to an article;
   an end of arm tool, the end of arm tool having:
      a mounting bracket mounting the end of arm tool to the robot arm for movement therewith;
      a plurality of operating mechanisms mounted to the mounting bracket, the operating mechanisms being substantially identical and being pivotable in the common plane containing their paths;
      a fastener associated with each operating mechanism for holding the operating mechanism in a fixed position in the common plane after the operating mechanism has been pivoted;
      a plurality of gripping devices with each single gripping device operatively connected to a respective operating mechanism by a movable gripper bracket carried upon the operating mechanism with the paths of movement of the gripping devices being linear and extending in a common plane;
      a plurality of individual motors each operatively connected to a respective gripping device for moving the respective gripping device along its respective path; and
      at least one programmable controller for operating the motors so as to adjust the positions of the gripping devices along their respective paths to one of a plurality of predetermined positions established by the controller for gripping the article and to position the end of arm tool adjacent the article so that at least one of the gripping devices grips the article.

14. The end of arm tool of claim 13 wherein each gripper bracket is movable by the respective motor with the respective gripping device being secured to the gripper bracket for movement with the gripper bracket.

15. The end of arm tool of claim 13 including each motor having a stepping mechanism controlled by at least one controller for positioning the respective gripping device at one of the several predetermined locations.

* * * * *

UNITED STATES PATENT AND TRADEMARK OFFICE
CERTIFICATE OF CORRECTION

PATENT NO. : 7,611,180 B1 Page 1 of 1
APPLICATION NO. : 11/493953
DATED : November 3, 2009
INVENTOR(S) : Fisher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Twelfth Day of October, 2010

David J. Kappos
*Director of the United States Patent and Trademark Office*